United States Patent [19]

Cenker et al.

[11] 4,150,207

[45] Apr. 17, 1979

[54] ALUMINA TRIHYDRATE AS FLAME RETARDANT AGENT FOR URETHANE-MODIFIED CARBODIIMIDE-ISOCYANURATE FOAMS

[75] Inventors: Moses Cenker, Trenton; Thirumurti Narayan, Riverview, both of Mich.

[73] Assignee: BASF Wyandotte Corporation, Wyandotte, Mich.

[21] Appl. No.: 805,884

[22] Filed: Jun. 13, 1977

[51] Int. Cl.$^2$ .................... C08G 18/14; C08G 18/24; C08J 9/00

[52] U.S. Cl. .................... 521/174; 521/117; 521/123; 521/126; 521/129; 521/131; 521/160; 521/901; 521/902; 521/906

[58] Field of Search ............... 260/DIG. 24, 2.5 BF, 260/2.5 AW, 2.5 AK, 2.5 AJ; 521/174, 117, 160, 123, 126, 131, 129, 901, 902, 906

[56] References Cited

U.S. PATENT DOCUMENTS

| | | | |
|---|---|---|---|
| 3,723,366 | 3/1973 | Kan | 260/2.5 BF |
| 3,746,709 | 7/1973 | Patton et al. | 260/2.5 BF |
| 3,766,103 | 10/1973 | Patton et al. | 260/2.5 AC |
| 3,772,217 | 11/1973 | Kan et al. | 260/2.5 BF |
| 3,810,851 | 5/1974 | Norman et al. | 260/2.5 AJ |
| 3,887,510 | 6/1975 | Chan et al. | 260/78 TF |
| 3,891,578 | 6/1975 | Kan et al. | 260/2.5 BF |
| 3,891,579 | 6/1975 | Cenker et al. | 260/2.5 AC |
| 3,894,972 | 7/1975 | Marayan et al. | 260/2.5 BF |
| 3,909,464 | 9/1975 | Anorga et al. | 260/2.5 AJ |
| 3,919,145 | 11/1975 | Eckhoff | 260/22 TN |
| 3,922,238 | 11/1975 | Narayan et al. | 260/2.5 BF |
| 3,928,256 | 12/1975 | Cenker et al. | 260/2.5 BF |
| 3,965,052 | 6/1976 | Iwasaki | 260/2.5 AK |
| 3,981,829 | 9/1976 | Cenker et al. | 260/2.5 BF |
| 4,000,114 | 12/1976 | Gordon et al. | 260/DIG. 24 |

*Primary Examiner*—Ronald W. Griffin
*Attorney, Agent, or Firm*—Joseph D. Michaels; Bernhard R. Swick; Robert E. Dunn

[57] ABSTRACT

Urethane-modified carbodiimide-isocyanurate foams are prepared by catalytically condensing (a) an organic polyisocyanate with a polyol or (b) a quasi-prepolymer in the presence of a blowing agent and from 20 parts to 100 parts by weight of alumina trihydrate. The resulting foams are characterized by improved flame retardancy without loss in strength properties.

9 Claims, No Drawings

ALUMINA TRIHYDRATE AS FLAME RETARDANT AGENT FOR URETHANE-MODIFIED CARBODIIMIDE-ISOCYANURATE FOAMS

BACKGROUND OF THE INVENTION

1. Field Of The Invention

The present invention relates to rigid foams characterized by carbodiimide, isocyanurate and urethane linkages and improved flame retardancy. More particularly, the invention relates to rigid foams prepared by catalytically condensing (a) an organic polyisocyanate with a polyol or (b) a quasi-prepolymer in the presence of a blowing agent and alumina trihydrate.

2. Prior Art

The preparation of urethane-modified carbodiimideisocyanurate foams is well known in the art. Generally these foams are prepared by the condensation of an organic polyisocyanate in the presence of a polyol, a blowing agent and a catalyst system which promotes the carbodiimide, isocyanurate and urethane reactions. The foams may also be prepared by condensing, in the presence of a blowing agent, a quasi-prepolymer prepared by the reaction of a stoichiometric excess of an organic polyisocyanate with a polyol. Various catalyst systems have been described in the art as useful for the preparation of these foams. Illustrative of the prior art in this area include U.S. Pat. Nos. 3,887,510; 3,891,578; 3,891,579; 3,894,972; 3,922,238; 3,928,256; and 3,981,829. The present invention is directed to an improvement in the process and compositions described in the aforementioned patents.

SUMMARY OF THE INVENTION

In accordance with the present invention, rigid foams characterized by carbodiimide, isocyanurate and urethane linkages and having improved flame retardant properties are prepared by catalytically condensing (a) an organic polyisocyanate with a polyol or (b) a quasi-prepolymer in the presence of a blowing agent and from 20 parts to 100 parts by weight of alumina trihydrate per 100 parts by weight of polyisocyanate. Employing alumina trihydrate in the preparation of the foams results in foams having improved flame retardant properties without a loss in the physical properties or closed cell content of the foams.

DESCRIPTION OF THE PREFERRED EMBODIMENTS

The organic polyisocyanate used in the preparation of the foams in accordance with the subject invention corresponds to the formula:

R''(NCO)$_z$ wherein R'' is a polyvalent organic radical which is either aliphatic, aralkyl, alkaryl, aromatic or mixtures thereof, and z is an integer which corresponds to the valence of R'' and is at least two. Representative of the organic polyisocyanates contemplated herein includes, for example, the aromatic diisocyanates such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as 4,4',4''-triphenylmethane triisocyanate, 2,4,6-toluene triisocyanates; the aromatic tetraisocyanates such as 4,4'-dimethyldiphenylmethane-2,2'-5,5'-tetraisocyanate, and the like; arylalkyl polyisocyanates such as xylylene diisocyanate; aliphatic polyisocyanates such as hexamethylene-1,6-diisocyanate, lysine diisocyanate methylester and the like; and mixtures thereof. Other organic polyisocyanates include polymethylene polyphenylisocyanate, hydrogenated methylene diphenylisocyanate, m-phenylene diisocyanate, naphthylene-1,5-diisocyanate, 1-methoxyphenylene-2,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate. These polyisocyanates are prepared by conventional methods known in the art such as the phosgenation of the corresponding organic amine. Quasi-prepolymers may also be employed in the process of the subject invention. These quasi-prepolymers are prepared by reacting an excess of organic polyisocyanate or mixtures thereof with a minor amount of an active hydrogen-containing compound as determined by the well-known Zerewitinoff test, as described by Kohler in *Journal Of The American Chemical Society*, 49, 3181 (1927). These compounds and their methods of preparation are well known in the art. The use of any one specific active hydrogen compound is not critical hereto, rather any such compound can be employed herein. Generally, the quasi-prepolymers have a free isocyanate content of from 20% to 40% by weight.

Suitable active hydrogen-containing groups as determined by the Zerewitinoff method which are reactive with an isocyanate group include —OH, —NH—, —COOH, and —SH. Examples of suitable types of organic compounds containing at least two active hydrogen-containing groups which are reactive with an isocyanate group are hydroxy-terminated polyesters, polyalkylene ether polyols, hydroxy-terminated polyurethane polymers, polyhydric polythioethers, alkylene oxide adducts of phosphorus-containing acids, polyacetals, aliphatic polyols, aliphatic thiols including alkane, alkene and alkyne thiols having two or more —SH groups; diamines including both aromatic aliphatic and heterocyclic diamines as well as mixtures thereof. Compounds which contain two or more different groups within the above-defined classes may also be used in accordance with the process of the present invention such as, for example, amino alcohols which contain an amino group and a hydroxyl group. Also, compounds may be used which contain one —SH group and one —OH group as well as those which contain an amino group and a —SH group. The active hydrogen-containing compound will generally have an equivalent weight of from 50 to 500 and a functionality of from 2 to 8.

Any suitable hydroxy-terminated polyester may be used such as are obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, hemimellitic acid, and 1,4-cyclohexanedicarboxylic acid. Any suitable polyhydric alcohol, including both aliphatic and aromatic, may be used such as ethylene glycol, 1,3-propylene glycol, 1,2-propylene glycol, 1,4-butylene glycol, 1,3-butylene glycol, 1,2-butylene glycol, 1,5-pentanediol, 1,4-pentanediol, 1,3-pentanediol, 1,6-hexanediol, 1,7-heptanediol, glycerol, 1,1,1-trimethylolpropane, 1,1,1-trimethylolethane, hexane-1,2,6-triol, α-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

The hydroxy-terminated polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above, or they may be made using the same components that make up the hydroxy-terminated polyester with only a portion of the components being a diamine such as ethylenediamine.

Any suitable polyalkylene ether may be used such as the polymerization product of an alkylene oxide or of an alkylene oxide with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and heteric or block copolymers of these oxides. The polyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols may have either primary or secondary hydroxyl groups and, preferably, are polyethers prepared from alkylene oxides having from two to six carbon atoms such as polyethylene ether glycols, polypropylene ether glycols, and polybutylene ether glycols. The polyalkylene polyether polyols may be prepared by any known process such as, for example, the process disclosed by Wurtz in 1859 and *Encyclopedia Of Chemical Technology*, Vol. 7, pp. 257–262, published by Interscience Publishers, Inc. (1951) or in U.S. Pat. No. 1,922,459. Alkylene oxide adducts of Mannich condensation products are also useful in the invention.

Alkylene oxide adducts of acids of phosphorus which may be used include those neutral adducts prepared from the alkylene oxides disclosed above for use in the preparation of polyalkylene polyether polyols. Acids of phosphorus which may be used are acids having a $P_2O_5$ equivalency of from about 72% to about 95%. The phosphoric acids are preferred.

Any suitable hydroxy-terminated polyacetal may be used such as, for example, the reaction product of formaldehyde or other suitable aldehyde with a dihydric alcohol or an alkylene oxide such as those disclosed above.

Any suitable aliphatic thiol including alkane thiols containing at least two —SH groups may be used such as 1,2-ethanedithiol, 1,2-propanedithiol, 1,3-propanedithiol, and 1,6-hexanedithiol; alkenethiols such as 2-butene-1,4-dithiol, and alkynethiols such as 3-hexyne-1,6-dithiol.

Any suitable polyamine may be used including aromatic polyamines such as methylene dianiline, polyarylpolyalkylene polyamine (crude methylene dianiline), p-aminoaniline, 1,5-diaminonaphthalene, and 2,4-diaminotoluene; aliphatic polyamines such as ethylenediamine, 1,3-propylenediamine; 1,4-butylenediamine, and 1,3-butylenediamine, as well as substituted secondary derivatives thereof.

In addition to the above hydroxy-containing compounds, other compounds which may be employed include graft polyols. These polyols are prepared by the in situ polymerization product of a vinyl monomer in a reactive polyol medium and in the presence of a free radical initiator. The reaction is generally carried out at a temperature ranging from about 40° C. to 150° C.

The reactive polyol medium generally has a molecular weight of at least about 500 and a hydroxyl number ranging from about 30 to about 600. The graft polyol has a molecular weight of at least about 1500 and a viscosity of less than 40,000 cps. at 10% polymer concentration.

A more comprehensive discussion of the graft polyols and their method of preparation can be found in U.S. Pat. Nos. 3,383,351; 3,304,273; 3,652,639; and 3,823,201, the disclosures of which are hereby incorporated by reference.

Also, polyols containing ester groups can be employed in the subject invention. These polyols are prepared by the reaction of an alkylene oxide with an organic dicarboxylic acid anhydride and a compound containing a reactive hydrogen atom. A more comprehensive discussion of these polyols and their method of preparation can be found in U.S. Pat. Nos. 3,585,185; 3,639,541; and 3,639,542. As is clear from the above, the particular polyol ingredient employed in the preparation of the quasi-prepolymer is not a critical aspect of the present invention. Any compound containing at least two reactive hydrogen atoms may be so used. Particularly preferred compounds are those having an equivalent weight between 100 and 400.

As mentioned above, the process of the subject invention can also be carried out by condensing an organic polyisocyanate in the presence of a polyol. Any of the organic compounds containing at least two active hydrogen-containing groups reactive with an isocyanate group described above in connection with the preparation of the "quasi-prepolymers" may be employed in the subject invention. Generally, the amount of polyol employed will be from about 0.1 to 0.8 equivalent, preferably from 0.1 to 0.6 equivalent per equivalent of polyisocyanate, resulting in an NCO/OH equivalent ratio of from about 3:1 to 50:1 or greater.

When a polyol is employed in the process of the subject invention, a urethane catalyst may also be employed. Urethane catalysts which may be employed are well known in the art and include the metal or organometallic salts of carboxylic acid and tertiary amines. Representative of such compounds are: dibutyltin dilaurate, dibutyltin diacetate, stannous octoate, lead octoate, cobalt naphthenate, and other metal or organometallic salts of carboxylic acids in which the metal is bismuth, titanium, iron, antimony, uranium, cadmium, aluminum, mercury, zinc, or nickel as well as other organometallic compounds such as are disclosed in U.S. Pat. No. 2,846,408. Tertiary amines such as triethylenediamine, triethylamine, diethylcyclohexylamine, dimethylethanolamine, methylmorpholine, trimethylpiperazine, N-ethylmorpholine and diethylethanolamine may also be employed as well as mixtures of any of the above. The preferred urethane-promoting catalyst is dibutyltin diacetate. Generally, the amount of the urethane-promoting catalyst employed will be from 0.01 part to 10 parts by weight per 100 parts by weight of polyisocyanate.

As mentioned above, the crux of the subject invention resides in the use of alumina trihydrate as flame retardant agent. The alumina trihydrate is employed in an amount within the range of 20 parts by weight to about 100 parts by weight per 100 parts by weight of organic polyisocyanate. The alumina trihydrate is generally available as a free-flowing powder and may be introduced into the foam reaction mixture by admixing it with the polyol or polyisocyanate component.

Compounds which promote carbodiimide linkages which are employed in the subject invention include aliphatic alcohols such as methyl alcohol and furfuryl alcohol; amino alcohols having a molecular weight of from 89 to 304 such as N,N-dialkylaminoalkanols, triethanolamine, N-2-hydroxyethylmorpholine and N,N,N',N'-tetrakis(2-hydroxypropyl)ethylene diamine and s-triazine compounds such as 2,4,6-tris(diethanolamino)-s-triazine, 2,4,6-tris(diisopropanolamino)-s-triazine, 2,4,6-tris(N-methylethanolamino)-s-triazine, and unsymmetrically substituted triazines of the formula:

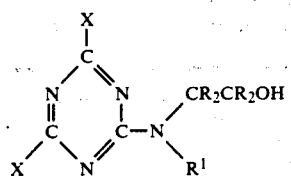

wherein R is hydrogen or lower alkyl of from 1 to 10 carbon atoms, $R^1$ is $CR_2CR_2OH$ or lower alkyl of from 1 to 12 carbon atoms, X is $NR_2$, alkoxy of from 1 to 12 carbon atoms, phenoxy, alkyl of from 1 to 12 carbon atoms, phenyl, hydroxyl, halogen aziridyl, pyrrolidyl, piperidyl, or N-alkylpiperazyl. Since the triazines are unsymmetrically substituted, it is apparent that each X cannot concurrently be

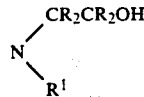

wherein each R and $R^1$ is the same. Generally from about 0.1 part to 10 parts by weight of carbodiimide-promoting compound per 100 parts by weight of polyisocyanate will be employed in the subject invention.

Trimerization catalysts which are employed in the present invention include 1,3,5-tris(N,N-dialkylaminoalkyl)-s-hexahydrotriazines; the alkylene oxide and water adducts of 1,3,5-tris(N,N-dialkylaminoalkyl)-s-hexahydrotriazines; triazines; 2,4,6-tris(dimethylaminomethyl)phenol; o-, p- or a mixture of o- and p-dimethylaminomethylphenol and triethylene diamine or the alkylene oxide and water adducts thereof, alkali metal carboxylates, alkali metal alkoxides, and organic boron-containing compounds. These compounds are well known in the art, as is their use as catalysts which promote isocyanurate linkages. 1,3,5-Tris(N,N-dialkylaminoalkyl)-s-hexahydro-triazine compounds have heretofore been described as useful isocyanate trimerization catalysts. See U.S. Pat. No. 3,723,366, the disclosure of which is hereby incorporated by reference. Preferred within this group of hexahydrotriazine compounds is 1,3,5-tris(N,N-dimethylaminopropyl)-s-hexahydrotriazine.

The alkylene oxide and water adducts of a 1,3,5-tris(N,N-dialkylaminoalkyl)-s-hexahydrotriazine are presumably quaternary ammonium hydroxides. These compounds are generally prepared by reacting equimolar amounts of the hexahydrotriazine, alkylene oxide and water at a temperature of from about 10° C. to 80° C. for a period of from about five minutes to two hours. Preferred within this group of compounds is the propylene oxide and water adduct of 1,3,5-tris(N,N-dimethylaminopropyl)-s-hexahydrotriazine. See U.S. Pat. Nos. 3,746,709 and 3,766,103, the disclosures of which are hereby incorporated by reference.

2,4,6-Tris(dimethylaminomethyl)phenol as well as o-, p- and a mixture of o- and p-(dimethylaminomethyl)phenol are known compounds which are commercially available products sold by Rohm & Haas under the trade names DMP-30 and DMP-10. Triethylenediamine and the alkylene oxide and water adducts thereof are also well known. The amount of trimerization catalyst which may be employed in the present invention is generally from 0.1 part to 20 parts by weight of catalyst per 100 parts by weight of polyisocyanate.

The foams of the present invention are prepared by mixing together the organic polyisocyanate, the polyol or the quasi-prepolymer, a blowing agent, alumina trihydrate and the catalysts at an initiating temperature which, depending on the catalyst, will range from about 0° C. to 50° C. The present invention also contemplates the incorporation of additional ingredients in the foam formulation to tailor the properties thereof. Thus, plasticizers, surfactants, such as the silicone surfactants, e.g. alkylpolysiloxanes, may be employed in the invention. Also, inorganic fillers, pigments and the like can be used.

In any event, the foams prepared in accordance herewith are rigid cellular products having a density of from about one pound to forty pounds per cubic foot which exhibit excellent strength and flame properties, such as fire resistance, low smoke evolution, and excellent weight retention.

Following are specific, non-limiting examples which are provided to illustrate the enumerated principles described herein. All parts are by weight unless otherwise indicated. In the Examples which follow, the following abbreviations are employed:

CMDI—crude diphenylmethane diisocyanate.
TDH—1,3,5-tris(N,N-dimethylaminopropyl)-s-hexahydrotriazine
DC-193—polyalkylsiloxane-polyoxyalkylene copolymer, a foam stabilizer
F-11B—trichlorofluoromethane
FA—furfuryl alcohol
MA—methyl alcohol
ATH—alumina trihydrate
DBTDA—dibutyltin diacetate
Polyol A—a polyol prepared by the reaction of ethylene oxide with trimethylolpropane, said polyol having an equivalent weight of 250
Polyol B—a polyol prepared by the reaction of ethylene oxide with ethylene glycol, said polyol having an equivalent weight of 200

In addition, the physical properties of the foams were determined in accordance with the following test methods:

Density—ASTM D -1622-63
Compression strength—ASTM D -1621-3
Tumbling friability—ASTM C - 421
Flame retardancy—ASTM D - 3014
Smoke density—NBS smoke density test Also, the presence of carbodiimide, isocyanurate and urethane linkages in the foams was confined by infrared spectroscopic analyses.

EXAMPLE I

Three foams were prepared by mixing in a vessel at high speed a stream of an organic polyisocyanate, a fluorocarbon blowing agent and alumina trihydrate and a stream containing a blend of polyol, catalysts and surfactant. Thereafter the resulting mixture was cast in a mold and the mixture was allowed to foam. The ingredients employed, amounts thereof and physical properties of the foams are presented in Table I, below.

As indicated by the data in the Table, the flame retardant properties of foams B and C (those of the present invention) as measured by Butler Chimney Test improved with added alumina trihydrate. The weight retention increased and there was a significant decrease in flame height. Moreover, a loss in closed cell content, a common occurrence associated with the use of inorganic fillers, was not obtained.

TABLE I

| Foam | A | B | C |
|---|---|---|---|
| CMDI | 100 | 100 | 100 |
| F-11B | 17 | 25 | 26 |
| DC-193 | 1 | 1 | 1 |
| Polyol B | 40 | 40 | 40 |
| FA | 3 | 3 | 3 |
| DBTDA | 1 | 0.5 | 0.5 |
| TDH | 3 | 3 | 3 |
| ATH | 0 | 25 | 50 |
| Density, pcf. | 2.1 | 2.0 | 2.1 |
| Closed cells, corr. % | 94 | 98 | 102 |
| Compressive strength, psi. 10% defl. | 19 | 17 | 13 |
| Tumbling friability, % wt. loss | 5 | 18 | 19 |
| Butler Chimney Test wt. ret. % | 88 | 93 | 92 |
| flame height, in. | 10 | 6 | 5 |
| time to SX, sec. | 12 | 10 | 10 |
| NBS Smoke Density, $D_m$ | 49 | 61 | 66 |

EXAMPLES II–XIII

A series of foams was prepared by mixing in a vessel at high speed a stream of polyisocyanate, alumina trihydrate and blowing agent, and a stream containing a polyol, catalysts, and surfactant. Thereafter the resulting mixture was cast in a mold and the foams were allowed to "free rise". The ingredients employed, amounts thereof and physical properties of the resulting foams are presented in Table II, below.

TABLE II

| Example: | II | III | IV | V | VI | VII | VIII | IX | X | XI | XII | XIII |
|---|---|---|---|---|---|---|---|---|---|---|---|---|
| CMDI | 300 | 300 | 300 | 300 | 300 | 300 | 300 | 300 | 300 | 300 | 300 | 300 |
| F-11B | 50 | 60 | 66 | 78 | 50 | 69 | 75 | 78 | 52 | 66 | 66 | 75 |
| ATH | — | 60 | 90 | 150 | — | 60 | 90 | 150 | — | 60 | 90 | 150 |
| FA | 9 | 9 | 9 | 9 | 9 | 9 | 9 | 9 | 9 | 9 | 9 | 9 |
| DBTDA | 3 | 3 | 1.5 | 1.5 | 3 | 1.5 | 1.5 | 1.5 | 3 | 1.5 | 1.5 | 1.5 |
| TDH | 9 | 9 | 9 | 9 | 9 | 9 | 9 | 9 | 9 | 9 | 9 | 9 |
| Polyol B | 90 | 90 | 90 | 90 | 120 | 120 | 120 | 120 | 150 | 150 | 150 | 150 |
| DC-193 | 3 | 3 | 3 | 3 | 3 | 3 | 3 | 3 | 3 | 3 | 3 | 3 |
| NCO/OH Equivalent Ratio | 5.0 | 5.0 | 5.0 | 5.0 | 3.8 | 3.8 | 3.8 | 3.8 | 3.0 | 3.0 | 3.0 | 3.0 |
| Density, pcf | 2.0 | 2.1 | 2.0 | 2.1 | 2.1 | 2.0 | 1.9 | 2.1 | 2.2 | 2.1 | 2.1 | 2.3 |
| Closed cells, corr. % | 95 | 98 | 100 | 99 | 94 | 98 | 99 | 102 | 91 | 95 | 100 | 101 |
| Compressive strength, psi., 10% defl. | 20 | 26 | 16 | 16 | 19 | 11 | 15 | 13 | 11 | 14 | 15 | 16 |
| Tumbling friability, % wt. loss | 8 | 29 | 27 | 43 | 5 | 24 | 24 | 19 | 1 | 9 | 11 | 18 |
| Butler Chimney Test wt. ret., % | 92 | 94 | 94 | 94 | 88 | 88 | 90 | 92 | 67 | 86 | 85 | 87 |
| flame height, in. | 8 | 6 | 7 | 3 | 10 | 10 | 8 | 5 | 10 | 10 | 10 | 8 |
| time to SX, sec. | 11 | 10 | 10 | 10 | 12 | 10 | 10 | 10 | 23 | 13 | 13 | 10 |
| NBS Smoke Density, $D_m$ | — | — | — | — | 49 | 46 | 41 | 66 | — | — | — | — |

EXAMPLES XIV–XXII

A series of foams was prepared in the manner described in Example I. The ingredients employed, amounts thereof as well as the physical properties of the resulting foams are presented in Table III, below. In all of the Examples that follow an NCO/OH equivalent ratio of 9.4:1 was employed.

TABLE III

| Example: | XIV | XV | XVI | XVII | XVIII | XIX | XX | XXI | XXII |
|---|---|---|---|---|---|---|---|---|---|
| CMDI | 300 | 300 | 300 | 300 | 300 | 300 | 300 | 300 | 300 |
| F-11B | 55 | 67 | 67 | 67 | 67 | 67 | 61 | 58 | 58 |
| FA | 3 | 3 | 3 | 3 | 3 | 3 | 9 | 9 | 9 |
| DC-193 | 3 | 3 | 3 | 3 | 3 | 3 | 3 | 3 | 3 |
| TDH | 9 | 9 | 9 | 9 | 9 | 9 | 9 | 9 | 9 |
| DBTDA | 0.9 | 0.9 | 0.9 | 0.9 | 0.9 | 0.9 | 3 | 3 | 3 |
| Polyol A | 60 | 60 | 60 | 60 | 60 | 60 | 60 | 60 | 60 |
| ATH | — | 45 | 60 | 75 | 90 | 150 | 45 | 60 | 75 |
| Density, pcf. | 2.0 | 1.9 | 2.0 | 1.9 | 2.1 | 2.4 | 1.9 | 2.1 | 2.3 |
| Closed cells, corr. % | 96 | 103 | 97 | 98 | 97 | 98 | 100 | 97 | 99 |
| Compressive, strength, psi., 10% defl. | 24 | 16 | 15 | 15 | 17 | 17 | 18 | 21 | 20 |
| Tumbling friability, % wt. loss | 24 | 40 | 38 | 52 | 49 | 53 | 27 | 25 | 28 |
| Butler Chimney Test wt. retained, % | 90 | 92 | 94 | 93 | 93 | 95 | 94 | 94 | 93 |
| flame height, in. | 6 | 5 | 4 | 4 | 4 | 4 | 5 | 5 | 5 |
| time to SX, sec. | 10 | 10 | 10 | 10 | 10 | 10 | 10 | 10 | 10 |

TABLE III-continued

| Example: | XIV | XV | XVI | XVII | XVIII | XIX | XX | XXI | XXII |
|---|---|---|---|---|---|---|---|---|---|
| NBS Smoke Density, $D_m$ | 125 | 90 | 69 | 97 | 100 | — | — | 101 | — |

The embodiments of the invention in which an exclusive property or privilege is claimed are defined as follows:

1. A urethane-modified carbodiimide-isocyanurate foam prepared by condensing (a) an organic polyisocyanate with a polyol or (b) an isocyanate-terminated quasi-prepolymer in the presence of (1) a catalytically sufficient amount of a catalyst system which promotes the carbodimide and isocyanurate reactions, (2) a blowing agent and (3) from 20 parts to 100 parts by weight based on 100 parts by weight of (a) or (b) of alumina trihydrate.

2. The foam of claim 1 wherein (a) is crude diphenylmethane diisocyanate.

3. The foam of claim 1 wherein the polyol is an ethylene oxide adduct of a polyhydric alcohol.

4. The foam of claim 3 wherein the polyhydric alcohol is ethylene glycol or trimethylolpropane.

5. The foam of claim 1 wherein the compound which promotes the carbodiimide reaction is furfuryl alcohol.

6. The foam of claim 1 wherein the compound which promotes the isocyanurate reaction is 1,3,5-tris-(N,N-dimethylaminopropyl)hexahydrotriazine.

7. The foam of claim 1 prepared in the presence of a catalyst which promotes the urethane reaction.

8. The foam of claim 1 wherein the catalyst is dibutyltin diacetate.

9. The foam of claim 1 prepared in the presence of a halocarbon blowing agent.

* * * * *